US012249303B2

(12) United States Patent
Trowers

(10) Patent No.: US 12,249,303 B2
(45) Date of Patent: Mar. 11, 2025

(54) HIGH-MASS ELLIPTICAL CUP MOUTHPIECE WITH CONICAL SECTION FOR BRASS MUSICAL INSTRUMENTS

(71) Applicant: Robert Trowers, Durham, NC (US)

(72) Inventor: Robert Trowers, Durham, NC (US)

( * ) Notice: Subject to any disclaimer, the term of this patent is extended or adjusted under 35 U.S.C. 154(b) by 228 days.

(21) Appl. No.: 18/092,830

(22) Filed: Jan. 3, 2023

(65) Prior Publication Data

US 2024/0221704 A1 Jul. 4, 2024

(51) Int. Cl.
*G10D 9/03* (2020.01)

(52) U.S. Cl.
CPC .................................... *G10D 9/03* (2020.02)

(58) Field of Classification Search
CPC ........................................................ G10D 9/03
See application file for complete search history.

(56) References Cited

U.S. PATENT DOCUMENTS 516,988 A * 3/1894 Ingram .................... G10D 9/03 84/398
556,757 A * 3/1896 Leeder ..................... G10D 9/03 84/398
768,603 A * 8/1904 Hennessey ............... G10D 9/03 84/398
1,178,513 A * 4/1916 George .................... G10D 9/03 84/398
1,556,729 A * 10/1925 Smith ...................... G10D 9/03 984/143
1,655,656 A * 1/1928 Morris ..................... G10D 9/03 984/143
2,018,738 A * 10/1935 Parduba ................... G10D 9/03 984/143
2,062,792 A * 12/1936 Limina .................... G10D 9/03 984/143
2,890,614 A * 6/1959 Fearn ....................... G10D 9/03 984/143
3,611,860 A * 10/1971 Tichenor .................. G10D 9/03 984/143
4,395,933 A * 8/1983 Shepley ................... G10D 9/03 984/143
5,353,673 A * 10/1994 Lynch ...................... G10D 9/03 84/398
D358,161 S * 5/1995 Kubala .......................... D17/13
D467,608 S * 12/2002 Hilliard .......................... D17/13
7,179,977 B1 * 2/2007 Kelly ....................... G10D 9/03 84/398
7,705,227 B2 * 4/2010 Hamanaga ............... G10D 9/03 84/387 R
7,893,333 B2 * 2/2011 Harrison .................. G10D 7/10 84/380 R
10,699,680 B2 * 6/2020 Trowers ................... G10D 7/10
2014/0109748 A1 * 4/2014 Griffin ..................... G10D 9/03 84/398
2015/0269919 A1 * 9/2015 Tseng ....................... G10D 9/03 84/398
2020/0126522 A1 * 4/2020 Trowers ................... G10D 7/10
2024/0221704 A1 * 7/2024 Trowers ................... G10D 9/03

* cited by examiner

*Primary Examiner* — Robert W Horn
(74) *Attorney, Agent, or Firm* — Aminah S. Ghaffar; Sacejewia W. White; NCCU IP Clinic

(57) ABSTRACT

A mouthpiece for use with brass-wind musical instruments which includes an elliptical cup with conical section internal contour and a high-mass design.

9 Claims, 2 Drawing Sheets

HIGH-MASS ELLIPTICAL CUP MOUTHPIECE WITH CONICAL SECTION FOR BRASS MUSICAL INSTRUMENTS

FIELD OF THE INVENTION

The present invention relates generally to a mouthpiece for use with brass-wind musical instruments. More particularly, the present application is directed to a mouthpiece to improve performance through providing a warm, centered sound while affording enhanced flexibility.

BACKGROUND OF THE INVENTION

The mouthpiece on a brass-wind instrument plays an important role in producing the sound the instrument makes when performing. It is well known that in order to produce notes of different frequencies a player of a brass musical instrument applies his/her lips with varying degrees of pressure to a generally cup-shaped mouthpiece and blows to cause vibration of the front portion of his/her lips. These vibrations are transferred to the air column in the bowl or cavity of the mouthpiece and thence to the instrument itself to produce notes of different frequencies. The typical mouthpiece for brass instruments consists of one of the following two internal contours: a "V" or funnel-shaped cup, or a "bowl" shaped cup. The shape of the cup affects the tone that is ultimately projected. The "V cup" has advantages in note flexibility and note attacking. Note attacking is known generally as the time it takes for the instrument to produce sound after the air has been blown into the mouthpiece by the player. The "V cup" mouthpiece requires less effort to move between the different registers of the horn but tends toward making a player's tone sound thin or airy, which demands more effort to counteract. The "bowl-shaped cup" provides a warmer, more sonorous tone. However, "bowl-shaped cup" mouthpieces require more effort to move between the different registers of the horn and the note attack is not as quick as a V-cup mouthpiece.

Practically all conventional mouthpieces have a bowl or funnel-shaped cup that ends with the "throat" or small opening at the bottom of the cup. From the throat, the mouthpieces follow a gradual increase in diameter that terminates where the mouthpiece fits into the instrument, known as the "backbore," which has the shape of a conical section.

Mouthpieces with bowls or cavities of various shapes have been used to improve the quality and the range of the notes produce, but none of these modifications have been successful in significantly improving performance.

SUMMARY OF THE INVENTION

The object of the present invention is to overcome the foregoing problems existing with conventional mouthpieces, by providing a mouthpiece with a "high-mass" design and a unique elliptical cup contour. The present invention is directed to brass instruments that require removable mouthpieces. In addition, the present invention is directed to a mouthpiece that delivers the optimal combination of increased endurance, ease of play and tonal quality.

The present invention is designed to provide a warm, centered sound while affording enhanced flexibility. The elliptical cup design of the present invention facilitates easy transitions between the low and high registers of the horn (flexibility) while eliminating the quality known as "airiness" from the tone. Elliptical shapes are chosen for this design because they provide a straighter path than the traditional "bowl shaped" mouthpieces (known for their warmer sound) but are more gently curved than "V cup" mouthpieces (known for their crisp attack and flexibility). The present invention provides a smoother air passage from the player's lips into the instrument. This design is helpful to trombonists who have "range" or "flexibility" issues, or who are striving for a warmer, more sonorous tone. The design is also adapted to other brass instruments such as trumpet, baritone, French horn, or tuba.

In one embodiment, the mouthpiece is removable and can be adapted for use in other brass instruments. In an embodiment, the present invention provides a mouthpiece fabricated with a "high-mass" design (or using a high-mass material) and includes one single device including a semi-circular rim, cup, throat, collar, shank, and backbore. The cup is constructed by four wall sections of differing angularity with respect to the longitudinal axis of the mouthpiece. The present invention includes an internal contour of one concave curve comprising the cup section. This section meets the throat.

In another embodiment, the present invention uses a semi-circular shaped rim, in contrast to conventional mouthpiece rims that are either flat or less aggressively curved. The rim design offers the user a tight and secure seal on the lips while exerting less pressure or force.

Another unique feature of the current invention is the "high-mass" design. The "high-mass" design helps the musician lock in partial notes with more ease, compared with traditional mouthpieces. Further, the "high-mass" design aids in centering the tone of the instrument. The use of additional weight or mass provides a centering effect on the resonant frequencies of brass instruments (known as partials), which constitutes the different tones produced by the instruments. Centering means that the partials, or tones produced, feel more secure to the player when the mass, or weight of the mouthpiece is increased.

In one embodiment, a mouthpiece for a brass-wind musical instrument comprises an upper section, wherein the upper section comprises an inner wall and outer wall of differing angularity with respect to a longitudinal axis of the mouthpiece forming a concave ellipse; a cup located within the upper portion; a rim, wherein the rim comprises the uppermost point of the mouthpiece; a collar situated immediately below and adjacent to the cup; a shank located immediately below and adjacent to the collar along the longitudinal axis; a throat located internally centered along the longitudinal axis in the collar, immediately below and adjacent to the cup; and a backbore situated at the bottom endpoint of the shank.

In an embodiment, the collar comprises a three-dimensional elliptical structure with a hollow opening situated perpendicular to the longitudinal axis.

In yet another embodiment, the shank comprises external left and right sides of equal length and internal sides with a convex ellipse contour forming a hollow opening running parallel to the longitudinal axis.

In one embodiment, the thickness between the inner wall and outer wall of the upper section is of about ¼ inch to about ½ inch.

In a different embodiment, the mouthpiece is constructed of brass, high-density plastic, or other high-mass material.

In a further embodiment, the mouthpiece is constructed from a solid piece of material.

In one embodiment, the cup is in fluid communication with the throat.

In yet another embodiment, the collar is constructed of brass, high-density plastic, or other high-mass material.

In still another embodiment, the rim is semicircular and is configured to provide a user a tight seal on the lips.

In one embodiment, the collar is an oval, circular, semi-circular, or rectangular shaped disk.

In an exemplary embodiment, a mouthpiece for a brass-wind musical instrument, comprises an upper section, wherein the upper section comprises an inner wall and outer wall of differing angularity with respect to a longitudinal axis of the mouthpiece forming a concave ellipse; a cup located within the upper portion; a semi-circular rim, wherein the rim comprises the uppermost point of the mouthpiece; a collar situated immediately below and adjacent to the cup, wherein the collar comprises a three-dimensional elliptical structure with a hollow opening situated perpendicular to the longitudinal axis; a shank located immediately below and adjacent to the collar along the longitudinal axis, wherein the shank comprises external left and right sides of equal length and internal sides with a conical section contour forming a hollow opening running parallel to the longitudinal axis; a throat located internally centered along the longitudinal axis in the collar, immediately below and adjacent to the cup; and a backbore situated at the bottom endpoint of the shank.

In one embodiment, the mouthpiece is constructed of brass, high-density plastic, or other high-mass material.

In another embodiment, the mouthpiece is constructed from a solid piece of material. In one embodiment, the cup is in fluid communication with the throat.

In yet another embodiment, the collar is constructed of brass, high-density plastic, or other high-mass material.

In still another embodiment, the collar is an oval, circular, semi-circular, or rectangular shaped disk.

In another exemplary embodiment, an elliptical mouthpiece for a brass-wind musical instrument, comprises an upper section; a cup located within the upper portion; a semi-circular rim, wherein the rim comprises the uppermost point of the mouthpiece; a collar situated immediately below and adjacent to the cup, wherein the collar comprises a three-dimensional elliptical structure with a hollow opening situated perpendicular to the longitudinal axis; a shank located immediately below and adjacent to the collar along the longitudinal axis, wherein the shank comprises external left and right sides of equal length and internal sides with a conical section contour forming a hollow opening running parallel to the longitudinal axis; a throat located internally centered along the longitudinal axis in the collar, immediately below and adjacent to the cup; and a backbore situated at the bottom endpoint of the shank.

In one embodiment, the upper portion is configured to provide an overall internal cavity that downwardly progresses from a wider portion to a relatively narrower portion in the direction from the rim toward the collar.

In one further embodiment, the upper portion comprises an internal concave ellipse.

In still another embodiment, the collar is constructed of brass, high-density plastic, or other high-mass material and wherein the collar is an oval, circular, semi-circular, or rectangular shaped disk.

Various objects, features, aspects and advantages of the inventive subject matter will become more apparent from the following detailed description of exemplary embodiments, along with the accompanying figures in which like numerals represent like components.

DETAILED DESCRIPTION

As used in the description herein and throughout the claims that follow, the meaning of "a," "an," and "the" includes plural references unless the context clearly dictates otherwise.

As used herein, the term "about" in conjunction with a numeral refers to a range of that numeral starting from 10% below the absolute of the numeral to 10% above the absolute of the numeral, inclusive.

As used herein, the term "high-mass" refers to the actual weight of the mouthpiece relative to the average weight of a standard mouthpiece, which is lower. For example, whereas the mouthpiece of the present invention weighs about 13 ounces, whereas a standard mouthpiece weighs about 5.4 ounces (a 2.4 ratio). The terms "mass" and "weight" are used interchangeably.

Figure 1:
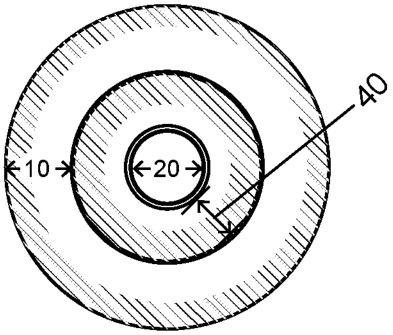
FIG. 1 depicts a top view of an exemplary configuration of the mouthpiece according to the present invention, and depicts the cup, semi-circular rim, and throat.

The invention structure as illustrated in FIGS. 1-4 will be specifically explained in greater detail. The similar numbers contained within FIGS. 1-4 refer to corresponding parts of mouthpiece 100. In one embodiment, as depicted in FIG. 1, mouthpiece 100 comprises throat 20, a cavity called cup 40, with semi-circular rim 10 that is configured for placement of a musician's mouth, comprising a circular inner edge and circular outer edge (see FIG. 1). In an embodiment, throat 20 is defined as the narrowest portion of cup 40 of mouthpiece 100. In one embodiment, the width of throat 20 measures about $^{11}/_{32}$ inch. Shading in FIG. 1 is just to differentiate the three different diameters.

Figure 2:
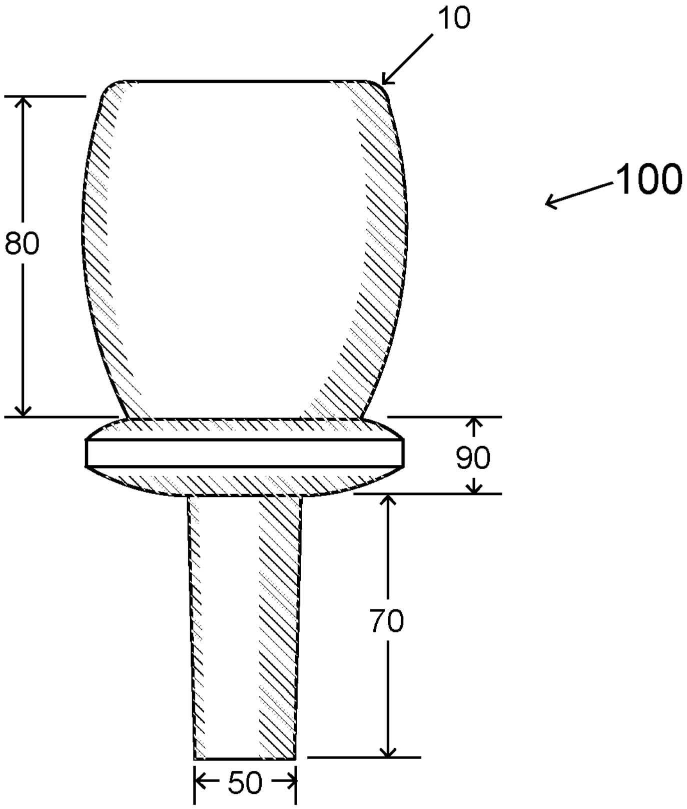
FIG. 2 depicts an external side view of an exemplary configuration of the mouthpiece according to the present invention, with high-mass design, cup, rim, collar, shank, and backbore.
Figure 3:
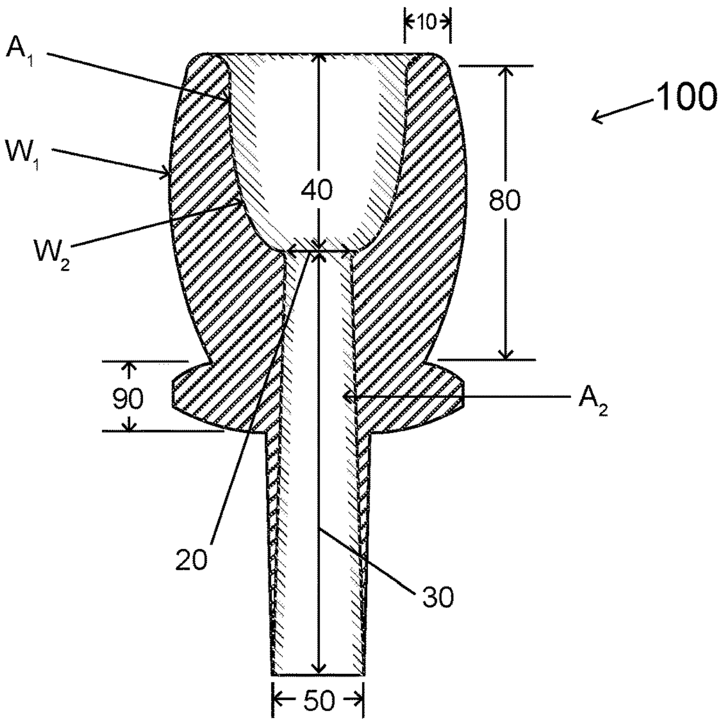
FIG. 3 depicts a cross-section of the internal contour and body configuration of an exemplary configuration of the elliptical mouthpiece, with high-mass design, rim, cup, throat, collar, shank, and backbore.
Figure 4:
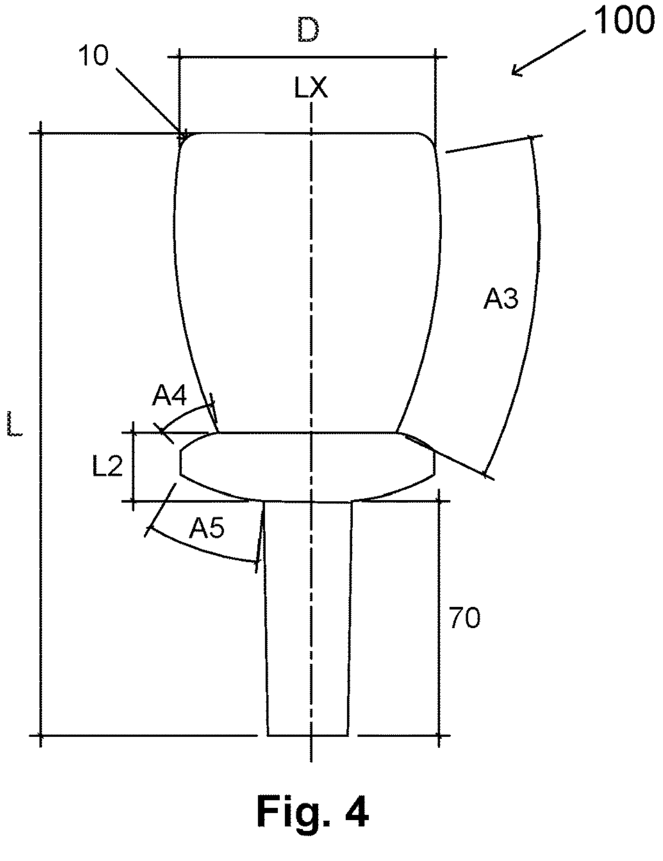
FIG. 4 depicts an external view of an exemplary configuration of the elliptical mouthpiece.

The exemplary embodiment in FIG. 2 depicts the front view of the body of mouthpiece 100, that is symmetrical along longitudinal axis LX (see FIG. 4). In this embodiment, mouthpiece 100 comprises semi-circular rim 10, upper section 80, cup 40, collar 90, shank 70, and backbore 50 (FIG. 3). Cup 40 is in fluid communication with throat 20. In one embodiment, mouthpiece 100 comprises passage 30 to throat 20 and backbore 50. In one embodiment, FIG. 3 shows a generally downward-sloping transition curve from the wider to narrower portion of cup 40. In an embodiment, upper portion 80 provides an overall internal cavity that downwardly progresses from a wider portion to a relatively narrower portion in the direction from rim 10 toward collar 90.

In one embodiment, rim 10 is located atop upper section 80, which is immediately followed by collar 90 and then shank 70 forms the bottom-most component. In one embodiment, mouthpiece 100 is about 3½ inches long and about 1½ inches wide. In another embodiment, mouthpiece 100 is about 3 to 4 inches long and about 1 to 2 inches wide. In another embodiment, shank 70 is configured to be inserted into a brass-wind instrument. In an embodiment, backbore 50 is an opening in shank 70 where mouthpiece 100 fits into a brass-wind instrument. In one embodiment of mouthpiece 100, components are tooled separately. In this embodiment, collar 90 can be connected via a plurality of screws to upper section 80 and shank 70 (not shown). This embodiment enables a user to have different options for collar 90 for different sound effect as desired. In another embodiment, mouthpiece 100 is formed as a single unit.

The exemplary embodiment depicted in FIG. 3, mouthpiece 100 comprises upper section 80, with an elliptical cup of radius A1, rim 10, disk-shaped collar 90, shank 70, with a conical section contour A2, and backbore 50. In one embodiment, A1 is an ellipse with a major axis of 1⅞ inches. In another embodiment, collar 90 is an oval, circular, semi-circular, or rectangular shaped disk. Inclusion of collar 90 adds further high-mass material to mouthpiece 100. Collar 90 of different thicknesses provides additional mass to mouthpiece 100. Collar 90 is also configured to afford sufficient surface area to affix markings, including engraving characters or other images onto collar 90.

In one embodiment, upper section 80 is about 1¾ inches long, wherein rim 10 is about ⅛ inch thick. In one embodiment, rim 10 is also configured to add a high mass to mouthpiece 100 by increasing the thickness of rim 10. In another embodiment, upper section 80 is about 1½ to 2 inches long and rim 10 is about 1/16 to ¼ inch thick. In one embodiment, the concave curve A3 of outer wall W1 of upper section 80 is about 36 degrees and the concave curve A4 of the inner wall W2 of upper section 80 is about 33 degrees. In another embodiment, the concave curve of outer wall W1 of upper section 80 is about 30 to 40 degrees. In one embodiment, cup 40 is about 1 inch wide. In another embodiment, cup 40 is about 1 to 2 inches wide. In an embodiment, collar 90 is located immediately below and adjacent to upper section 80 and terminates at shank 70, with shank 70 serving to connect mouthpiece 100 to the desired instrument. In one embodiment, there is 3/32 inches blending in the transfer from the curve of cup 40 to the curve of throat 20. In another embodiment, there is no blending from the curve of cup 40 to the curve of throat 20.

In one embodiment, L2 is the length of collar 90 with respect to outer wall W1 of upper section 80. In one embodiment, L2 sits about 5/32 inches below the outer wall of upper section 80. In another embodiment, the horizontal center line of collar 90 is located about 1/32 to 9/32 inches below the lowest point of outer wall W1 of upper section 80 (not shown.) In one embodiment, collar 90 comprises an elliptical shape, where each side protrudes from underneath upper section 80 at an approximate 33-degree angle (A4) and the concave elliptical sides of collar 90 join shank 70 at an approximate angle of 25 degrees (A5). In another embodiment, the sides of collar 90 protrude from underneath upper section 80 at an approximate 28 to 38-degree angle and the concave elliptical sides of collar 90 join shank 70 at an approximate angle of 20 to 30 degrees. In another embodiment, the sides of shank 70 reside immediately below and adjacent to collar 90 along the longitudinal axis LX of mouthpiece 100. In one embodiment, the vertical sides of shank 70 measure about 1⅜ inches from the top intersection point with collar 90 to the bottom of mouthpiece 100. In an embodiment, shank 70 measures about ½ inch across. In another embodiment, the vertical sides of shank 70 measure about 1 to 2 inches from the top intersection point with collar 90 to the bottom of mouthpiece 100. In this embodiment, shank 70 measures about ⅛ to about ¾ inch across.

In another embodiment, mouthpiece 100 may be formed from any high-mass material, such as brass, high-density plastic, or other high-density material. Mouthpiece 100 may be constructed by 3D printing, lathe turning, casting or any combination thereof.

In an embodiment, FIG. 3 illustrates the cross section of mouthpiece 100. In this embodiment, cup 40 is located within upper section 80. The unique internal contour of mouthpiece 100 is formed as follows: once the curve from the semi-circular mouthpiece rim 10 ends, cup 40 is formed of a single ellipse. In one embodiment, upper section 80 is formed from inner wall W2 and outer wall W1 of differing angularity with respect to the longitudinal axis LX, forming a concave ellipse having internal and external contour with the widest point D. The convex ellipse of the upper section 80 begins and slopes slightly inward, where it meets the larger conical section A2 which starts ⅝" above collar 90. The remaining sweep of conical section A2 runs through shank 70 and terminates at backbore 50. In one embodiment, the diameter of backbore 50 measures about 7/32 to 15/64 inches. In an embodiment, the thickness between inner wall W2 and outer wall W1 of upper section 80 is of about ¼ inch to about ½ inch. In another embodiment, the thickness between inner wall W2 and outer wall W1 of upper section 80 is about ½ to ⅞ inches.

Thus, exemplary embodiments of a mouthpiece for use with brass-wind instruments have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A mouthpiece for a brass-wind musical instrument, comprising:

i. an upper section, wherein said upper section comprises an inner wall and outer wall of differing angularity with respect to a longitudinal axis of said mouthpiece forming a concave ellipse;

ii. a cup located within said upper portion, wherein:

iii. the lower edge of said cup comprises a throat and said cup extends downward partially into said upper section, wherein:

a. said throat is located internally centered along the longitudinal axis in said upper section and immediately below and adjacent to said cup; and b. said cup is formed of a single ellipse;

iv. a backbore extending immediately downwardly below said throat, wherein the uppermost portion of said backbore extends downwards from the bottom of said cup;

V. a semi-circular rim comprising the uppermost point of said mouthpiece;

vi. a collar comprising a three-dimensional elliptical structure with a hollow opening situated perpendicular to said longitudinal axis;

vii. a shank located immediately below and adjacent to said collar along said longitudinal axis, wherein:

a. said shank comprises external left and right sides of equal length and internal sides with a conical section contour forming a hollow opening running parallel to said longitudinal axis, and b. said shank extends from the bottom edge of said collar, wherein said backbore extends to the bottom edge of said shank.

2. The mouthpiece of claim 1, wherein said mouthpiece is constructed of brass, high-density plastic, or other high-mass material.

3. The mouthpiece of claim 1, wherein said mouthpiece is constructed from a solid piece of material.

4. The mouthpiece of claim 1, whereas said cup is in fluid communication with said throat.

5. The mouthpiece of claim 1, wherein said collar is constructed of brass, high-density plastic, or other high-mass material.

6. The mouthpiece of claim 1, wherein said collar is an oval, circular, semi-circular, or rectangular shaped disk.

7. The mouthpiece of claim 1, wherein said semicircular rim is configured to provide a user a tight seal on the lips of a user.

8. The mouthpiece of claim 1, wherein said collar is configured to add high-mass material to said mouthpiece.

9. The mouthpiece of claim 1, wherein said collar is an oval, circular, semi-circular, or rectangular shaped disk.

* * * * *